(12) United States Patent
Susko

(10) Patent No.: US 10,800,306 B2
(45) Date of Patent: Oct. 13, 2020

(54) PYROTECHNIC LOCKING DEVICE

(71) Applicant: Ford Global Technologies, LLC, Dearborn, MI (US)

(72) Inventor: Thomas J. Susko, Saint Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 48 days.

(21) Appl. No.: 16/033,675

(22) Filed: Jul. 12, 2018

(65) Prior Publication Data

US 2020/0017009 A1    Jan. 16, 2020

(51) Int. Cl.
| | |
|---|---|
| *B60N 2/90* | (2018.01) |
| *F15B 15/19* | (2006.01) |
| *F15B 15/14* | (2006.01) |
| *B60N 2/16* | (2006.01) |
| *B60N 2/22* | (2006.01) |
| *B60N 2/20* | (2006.01) |
| *B60N 2/08* | (2006.01) |

(52) U.S. Cl.
CPC ............. *B60N 2/919* (2018.02); *F15B 15/14* (2013.01); *F15B 15/19* (2013.01); *B60N 2/0881* (2013.01); *B60N 2/1685* (2013.01); *B60N 2/20* (2013.01); *B60N 2/2218* (2013.01); *B60N 2002/952* (2018.02)

(58) Field of Classification Search
CPC .................. B60N 2/919; B60N 2/2218; B60N 2002/952; F15B 15/14; F15B 15/19
See application file for complete search history.

(56) References Cited

U.S. PATENT DOCUMENTS

| | | | |
|---|---|---|---|
| 6,050,117 A | 4/2000 | Weyerstall | |
| 6,513,880 B2 * | 2/2003 | Yamaguchi | .......... B60N 2/4221 280/806 |
| 8,297,697 B2 * | 10/2012 | Gross | ................... B60N 2/4221 297/216.1 |
| 8,602,491 B2 * | 12/2013 | Gilbert | ................. B60N 2/0232 297/216.1 |
| 9,789,846 B2 * | 10/2017 | Henck | ...................... B60R 21/38 |
| 2015/0239373 A1 | 8/2015 | Weng et al. | |

FOREIGN PATENT DOCUMENTS

| | | |
|---|---|---|
| DE | 19545722 A1 | 4/1997 |
| EP | 1162333 B1 | 12/2005 |

* cited by examiner

*Primary Examiner* — Xuan Lan Nguyen

(74) *Attorney, Agent, or Firm* — David Coppiellie; Price Heneveld LLP

(57) ABSTRACT

A vehicular locking device includes a bore having first and second ends. A gas generating device is proximate the first end. A piston is movable along an interior of the bore. The vehicular locking device includes first and second plates. The second plate includes an aperture. Activation of the gas generating device accelerates the piston through the aperture and the second plate preventing displacement of the second plate.

14 Claims, 6 Drawing Sheets

PYROTECHNIC LOCKING DEVICE

FIELD OF THE INVENTION

The present invention generally relates to a locking device for a vehicle, and more particularly, a pyrotechnic locking device for a vehicle.

BACKGROUND OF THE INVENTION

Automotive seating assemblies often include integrated restraints that may have features such as a manual or power height and position adjuster coupled to the seat at a linkage. A locking device coupling certain vehicular seating components may be desired.

SUMMARY OF THE INVENTION

According to one aspect of the present disclosure, a vehicular locking device includes a bore having first and second ends. A gas generating device is proximate the first end. A piston is movable along an interior of the bore. The vehicular locking device includes first and second plates. The first plate includes an aperture. Activation of the gas generating device accelerates the piston through the aperture and the second plate preventing displacement of the second plate.

Embodiments of the first aspect of the invention can include any one or a combination of the following features:
- an electronic control module configured to activate the gas generating device;
- a sensor configured to detect displacement of the second plate and send a signal to the electronic control module to activate the gas generating device;
- the sensor is a mechanical load sensor;
- the first and second plates comprise part of a seat adjustment assembly;
- the gas generating device comprises a pyrotechnic material configured to expand when activated;
- a third plate including a second aperture, the piston configured to pass through the second aperture when the locking device is activated;
- the second plate is one of a movable and rotatable plate;
- the first and second plates are substantially parallel;
- a body comprises a plurality of vents configured to enable release of the bore when the gas generating device is activated;
- the piston comprises a narrow punch configured to puncture the second plate; and
- an end of the piston includes a flange configured to contact a narrow second end of the bore preventing the piston from exiting the bore after activation of the gas generating device.

According to another aspect of the present invention, a vehicular locking device includes a body having a bore with a first end proximate a gas generating device and a second end proximate at least one fixed plate having an aperture. A piston is movable along the inside of the bore. A seat adjustment assembly includes a movable plate disposed proximate to the at least one fixed plate. Activation of the gas generating device accelerates the piston through the aperture and the second plate preventing displacement of the seat adjustment assembly.

Embodiments of the first aspect of the invention can include any one or a combination of the following features:
- a mounting surface for mounting of said device to a vehicle; and
- the mounting surface is mounted to a vehicle seat.

According to a further aspect of the present invention, a method of operating a locking device includes activating a gas generating device such that gas expands within a body. A piston is accelerated within the body through an aperture of at least one fixed plate outside of the body. A movable plate is punctured with the piston, the piston preventing displacement of the movable plate.

Embodiments of the first aspect of the invention can include any one or a combination of the following features:
- communicating an activation signal from an electronic control module to the gas generating device;
- displacement of the movable plate is prevented by a portion of the piston extending through the movable plate;
- igniting the gas within the body; and
- contacting a flange of the piston with a second end of the body stopping acceleration of the piston.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1A:
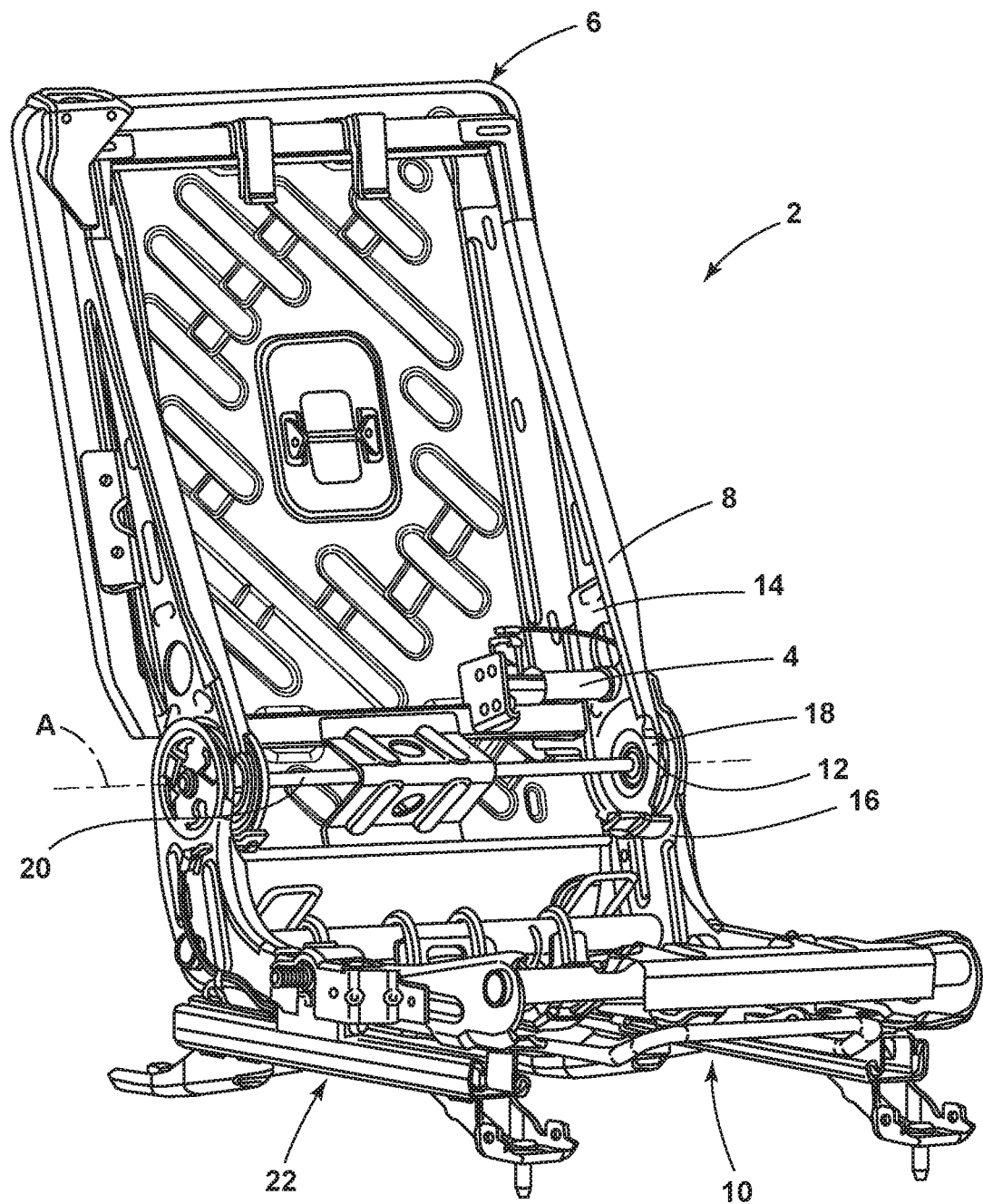
FIG. 1A is a perspective view of a vehicle seating assembly including a locking device.
Figure 1B:
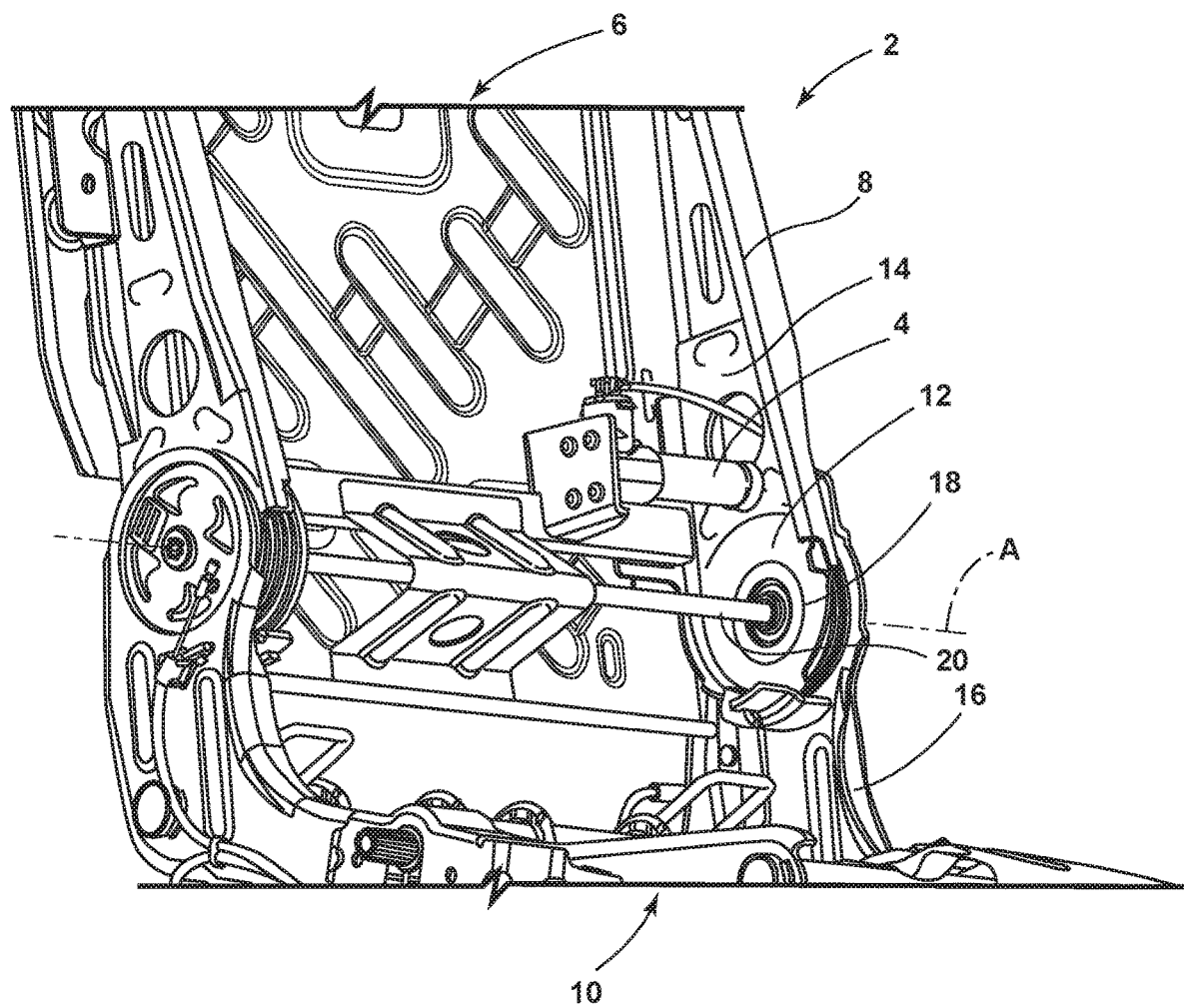
FIG. 1B is a side-perspective view of a seatback of the vehicle seating assembly with the locking device coupled to the seatback.
Figure 1C:
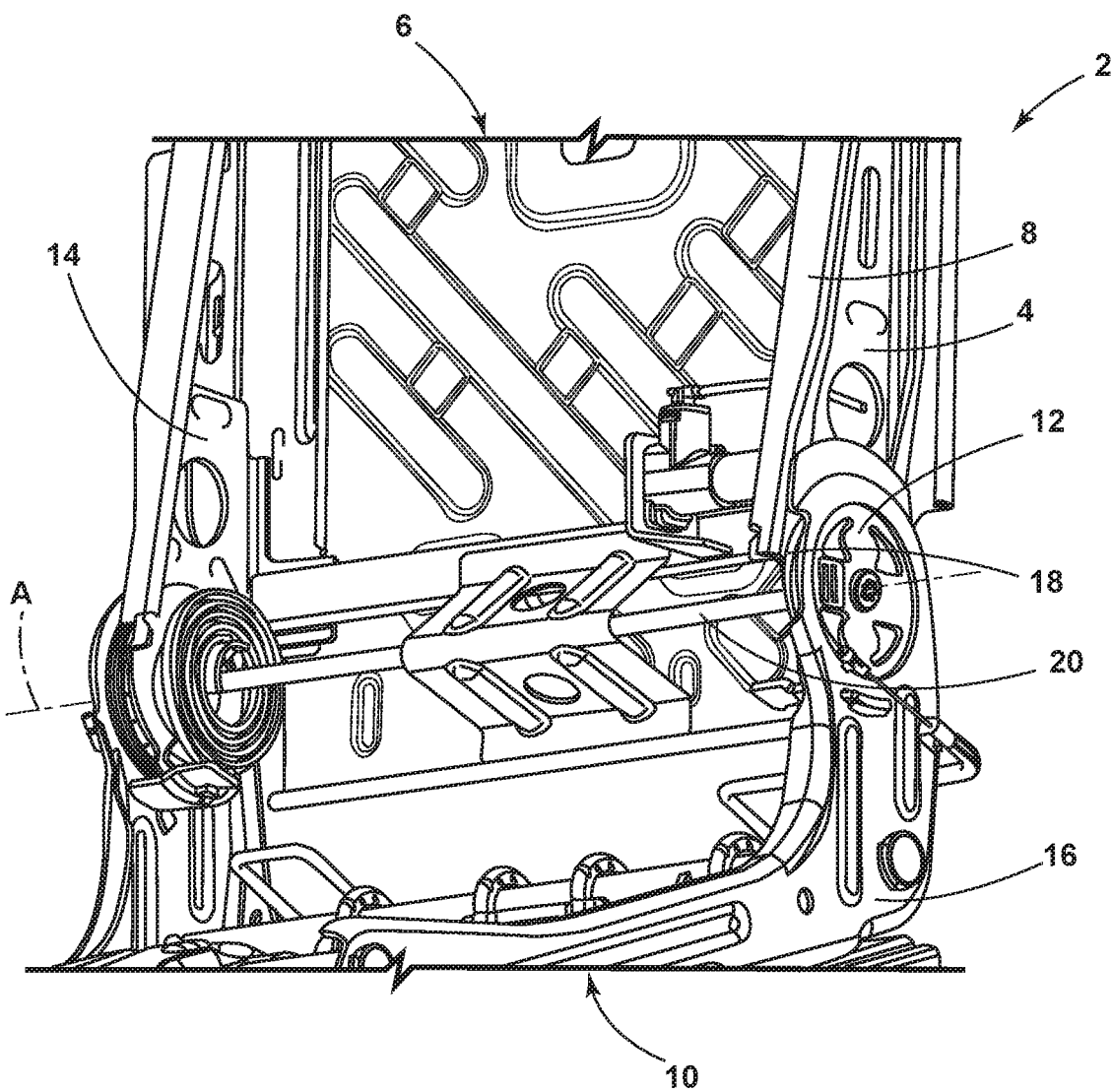
FIG. 1C is a side-perspective view of the seatback and a rotatable linkage assembly for coupling the seatback to a seat portion of the seating assembly.

For purposes of description herein, the terms "upper," "lower," "right," "left," "rear," "front," "vertical," "horizontal," "interior," "exterior," and derivatives thereof shall relate to the disclosure as oriented in FIGS. 1A-C. However, it is to be understood that the disclosure may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The following disclosure describes a vehicular pyrotechnic locking device and related methods of use. The locking device is configured to puncture a movable plate of a vehicular seating assembly in order to prevent displacement of the movable plate in the event that the vehicular seating assembly experiences substantial displacing load forces. The locking device may include a pyrotechnic gas generating device coupled to a body. Disposed within the body is a bore configured to accommodate a slidable piston. An electronic control module may be coupled to the pyrotechnic gas generating device and may be configured to send a signal to the gas generating device to ignite a gas. Once the gas is ignited, the pressure inside the body increases, forcibly thrusting the piston away from a first end of the bore. A punch portion of the piston then passes through an aperture of at least one fixed plate, where it then punctures a second movable plate. Therefore, the locking device may be utilized in adjustable seating assemblies in order to prevent displacement of adjustable seating components.

Referring to FIGS. 1A-C, an adjustable seating assembly 2 for a vehicle is shown including a locking device 4 configured to prevent displacement of at least one movable plate of the seating assembly 2. The seating assembly 2 includes a seatback 6 having at least one side support plate 8 that may extend a height of the seatback 6. The seatback 6 may be coupled to a seat portion 10 by a rotatable linkage assembly 12. The side support plate 8 may be fixed to an arm 14 extending from the rotatable linkage assembly 12. An orthogonal support plate 16 may extend upright from the seat portion 10 to couple the seat portion 10 to the rotatable linkage assembly 12. The rotatable linkage assembly 12 may include a rotatable disc 18 coupled to the orthogonal support plate 16 by a lateral support bar 20 that may define a common axis of rotation A. The disc 18 may be coupled to the orthogonal support plate 16 by a weld. The lateral support bar 20 may be a cross tube that opens the disc 18 for reclining the seating assembly 2. The seatback 6 may be configured to rotate about the common axis of rotation in order to adjust the angle of the seatback 6 relative to a perpendicular position of the seat portion 10. As the angle of the seatback 6 is adjusted, the lateral support bar 20 may be configured to rotate such that the rotatable disc 18 may pivot about the common axis of rotation relative to the orthogonal support plate 16.

The rotatable linkage assembly 12 may be in electronic communication with a control panel (not shown) configured to enable a passenger to adjust a condition of the seating assembly 2. For instance, the control panel may enable adjustment of the rotatable linkage assembly 12 to adjust the angle of the seatback 6. Alternatively, the seating assembly 2 may be adapted to adjust the height of the seat portion 10, or to enable translational adjustment of the seating assembly 2 along a slide assembly 22 (FIG. 1A). In one aspect of the invention, the height of the seat portion 10 and the seatback 6 may be adjusted together, rather than individually adjusting the position of the seat portion 10 with respect to the seatback 6. As such, the seating assembly 2 may be adapted as a unitary assembly capable of angular adjustment of the seatback 6, the height adjustment of the seat portion 10 and the seatback 6, and translational adjustment of the seating assembly 2 within a vehicle cabin. In each of these aspects, the locking device 4 may be coupled to the seating assembly 2 at various adjustment points. Accordingly, the locking device 4 may be activated in the event of a detection of a load force that may damage or otherwise cause the seating assembly 2 to reposition. The load force may correspond to a predetermined force identified based on specific design and materials implemented for the seating assembly 2. In this way, activation of the locking device 4 ensures that the seating adjustment components within the load path remain fixed to the seating assembly 2.

Figure 2:
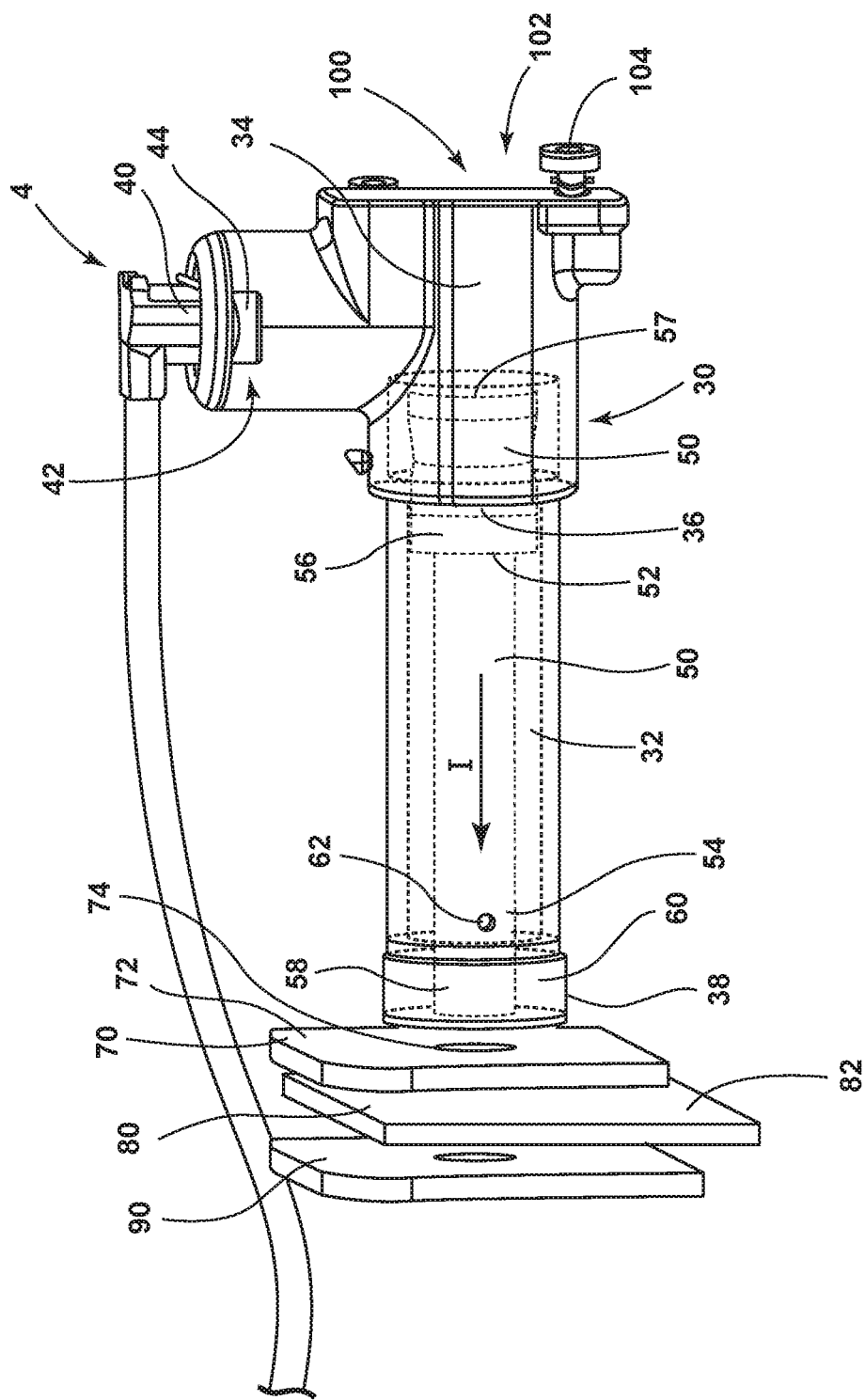
FIG. 2 is a perspective view of the locking device prior to activation of a gas generating device and ejectment of a piston within a body of the locking device.
Figure 3:
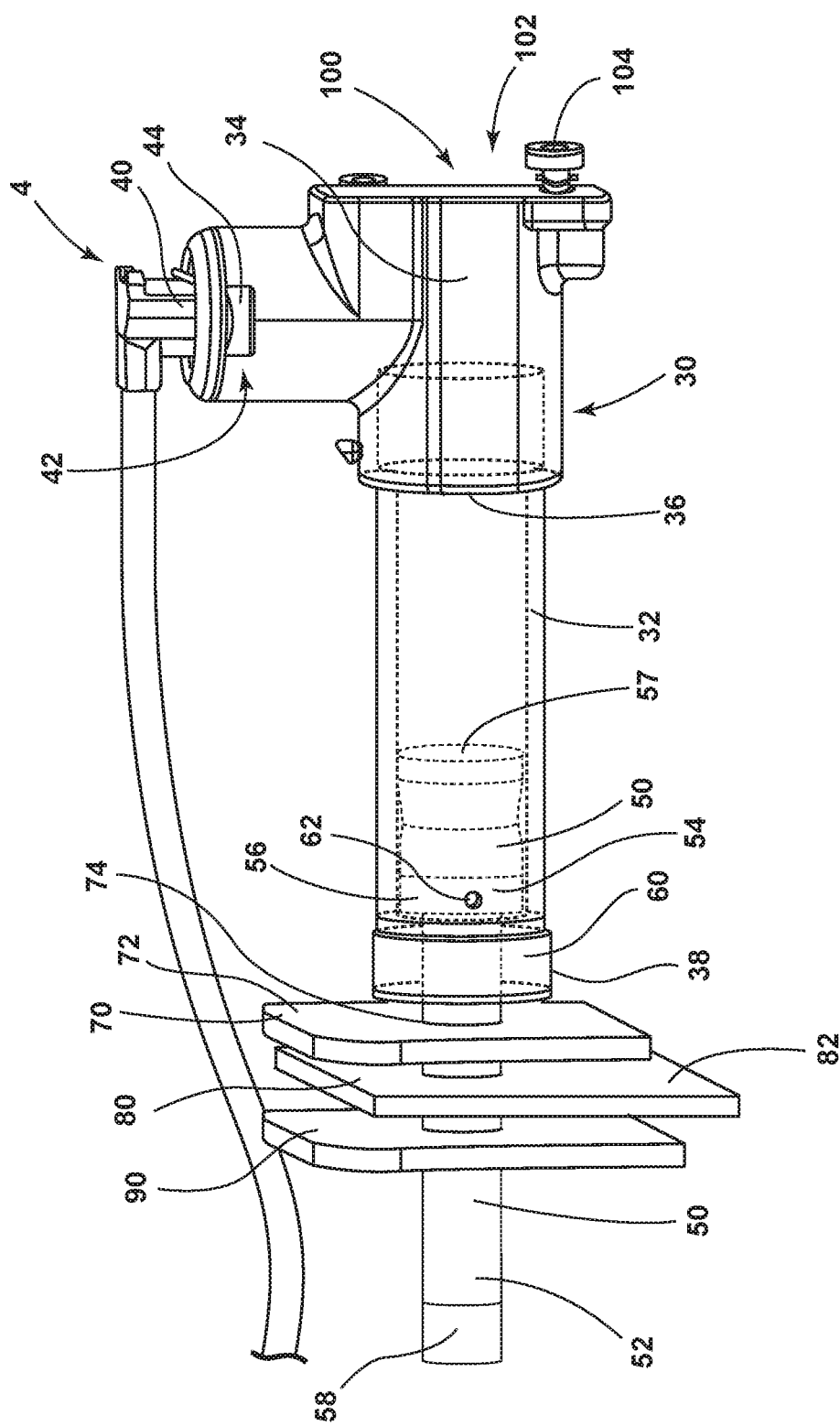
FIG. 3 is a perspective view of the locking device after activation of the gas generating with the piston puncturing a fixed plate of a vehicle seating assembly.

Referring to FIGS. 2 and 3, the locking device 4 for a vehicle is shown. The locking device 4 may include an elongated body 30 having a cylindrical bore 32 and a cavity 34. The elongated body 30 may form a barrel wherein the cylindrical bore 32 is formed therethrough. The cavity 34 is position adjacent to the bore 32 and extends orthogonally and upright with respect to the bore 32. The bore 32 may be disposed within the body 30 and may include a first end 36 and a second end 38. A gas generating device 40 is coupled to the body 30 near a top portion 42 of the cavity 34. The gas generating device 40 may include an ignition device 44 positioned atop the cavity 34. The ignition device 44 may be a spark plug or any such device capable of generating a brief ignition source or charge. The gas generating device 40 may generally include a pyrotechnic expansion device configured to ignite a substance in order to create a phase change from a solid or liquid to a gas in order to increase pressure within the body 30 when the locking device 4 is activated. The gas generating device generally includes a pyrotechnic material such as, but not limited to, binary powders, chemical oxygen generators, smokeless powder, various propellants, high test peroxide, and other such materials capable of phase change or expansion.

With reference to FIG. 2, a cylindrical piston 50 may extend the length of the bore 32. The piston 50 may include a first portion 52 and a second portion 54 proximate the first and second ends 36, 38 of the bore 32, respectively. A rounded flange 56 extends from the first portion 52 of the piston 50, and is partially enclosed within the cavity 34 such that a base 57 of the flange 56 is in close proximity to the gas generating device 40. A circumference of the flange 56 may be slightly less than a circumference of the first end 36 of the bore 32 such that the flange 56 partially seals the bore 32 from the cavity 34 while still enabling translational movement of the flange 56 through the bore 32 upon activation of the locking device 4. A cylindrical punch 58 defines the second portion 54 of the piston 50 and may be pressed flush against a cap 60 that may enclose the body 30 proximate the second end 38 of the bore 32. The cap 60 may be configured to protect the bore 32 and piston 50 from contaminants.

A circumference of the punch 58 is substantially less than the circumference of the bore 32 in order to enable movement of the punch 58 through the second end 38 of the bore 32. The second end 38 of the bore 32 may include a reduced circumference that is substantially less than the circumference of the first end 36 of the bore 32, however, slightly wide enough to enable movement of the punch 58 therethrough. Additionally, at least a portion of the punch 58 may be formed of a hardened material in order to prevent shattering of the punch 58 and/or piston 50 once the locking device 4 is activated. The punch 58 may be formed of a steel, titanium, or any other shatter-resistant metal alloy or hardened substance. Alternatively, the entirety of the piston 50 may be formed of a hardened material in order to increase the effectiveness of the punch 58 upon activation of the locking device 4.

With reference to FIGS. 2 and 3, the piston 50 may be slidable between a first position and a second position. While in the first position, the piston 50 may be fully disposed within the body 30, and the flange 56 is interposed between the bore 32 and the cavity 34 (FIG. 2). Activation of the gas generating device 40 forcibly propels the piston 50 from the first position to the second position at a high velocity. Once the piston 50 has been forced into the second position, at least the second portion 54 and the punch 58 of the piston 50 may be ejected from the body 30 (FIG. 3). Furthermore, the flange 56 may contact the second end 38 of the bore 32 in order to prevent complete ejection of the piston 50 from the body 30. As such, the circumference of the flange 56 may be sufficiently greater than the circumference of the second end 38 of the bore 32. Furthermore, the body 30 includes one or more vents 62 proximate the second end 38 of the bore 32. The one or more vents 62 are configured to release gas once the locking device 4 has been activated and the piston 50 has been forced from the body 30.

With reference to FIGS. 1A-3, at least one fixed plate 70 may be disposed outside of the body 30 and may include a first face 72 adjacent the second end 38 of the bore 32. The fixed plate 70 may correspond to a surface of the side support plate 8 of the seatback 6 or the rotatable linkage assembly 12 (as shown in FIGS. 1A-C). The fixed nature of the plate 70 relates to the position of the plate 70 position relative to the locking device 4, as the fixed plate 70 may be movable relative to the seating assembly 2. However, the relative position of the fixed plate 70 and the locking device 4 remains substantially fixed. Additionally, the fixed plate 70 may include a circular aperture with a circumference substantially similar to that of the circumference of the punch 58 (FIGS. 2 and 3). The aperture is substantially aligned with the axis of the punch 58 such that the punch 58 may extend through the aperture without contacting the fixed plate 70 upon activation of the locking device 4.

A movable plate 80 may be adjacent and parallel to the fixed plate 70 such that the fixed plate 70 may be interposed between the locking device 4 and the movable plate 80. The movable plate 80 may include a closed face 82, and unlike the fixed plate 70, may lack an aperture. The movable plate 80 may be configured to slide translationally or vertically, or alternatively, be capable of rotational movement with respect to the locking device 4. As such, the movable plate 80 may correspond to the orthogonal support plate 16 of the seat portion 10 (FIGS. 1A-C). In other aspects, the movable plate 80 may correspond to a movable slide rail configured to enable translational adjustment of the seating assembly 2.

With continued reference to FIGS. 1A-3, it is also contemplated that a second fixed plate 90 may be adjacent to the movable plate 80 such that the movable plate 80 is interposed between the first and second fixed plates 70, 90 (FIGS. 2 and 3). The second fixed 90 plate may include an aperture 74 configured to accept the piston 50 once the punch 58 punctures the second fixed plate 90 upon activation of the device. Although, the aspect of the second fixed plate 90 is depicted in FIGS. 2 and 3, the present invention is equally capable of including a single fixed plate. Together, the fixed plates 70, 90 and the movable plate 80 may form the adjustable seating assembly 2, an adjustable mounting assembly 100, or any other comparable adjustable linkage assemblies that may be in the load path of a vehicle seating assembly. In one embodiment, at least one of the fixed plates 70, 90 may form a stationary mounting rail, with the movable plate 80 forming part of a slide rail, which enables translational adjustment of the vehicle seat position. Alternatively, the movable plate 80 and the fixed plate 70 may be configured to enable vertical adjustment of the vehicle seat or angular adjustment of the seatback 6 (as shown in FIGS. 1A-C). As such, the fixed plate 70 may be coupled to a movable structure that enables adjustment of a vehicle seating assembly. Therefore, the fixed plates 70, 90 are stationary with respect to the locking device 4.

With reference to FIGS. 2 and 3, the locking device 4 further includes the mounting assembly 100 external to the body 30 at a distal end 102 of the locking device 4 that is opposite the fixed plate 70. The mounting assembly 100 enables mounting of the locking device 4 to at least one stationary vehicle component. For instance, the mounting assembly 100 may fix the locking device 4 to a vehicle floor 200, a vehicle seatback, or a vehicle center console. The mounting assembly 100 may include a plurality of fixtures or attachment points 104 configured to securely fasten the locking device 4 to a stationary vehicle component. The mounting assembly 100 is generally capable of withstanding substantial ejection forces caused by the activation of the locking device 4 without resulting in the mounting assembly 100 breaking off from its desired mounting location.

Figure 4:
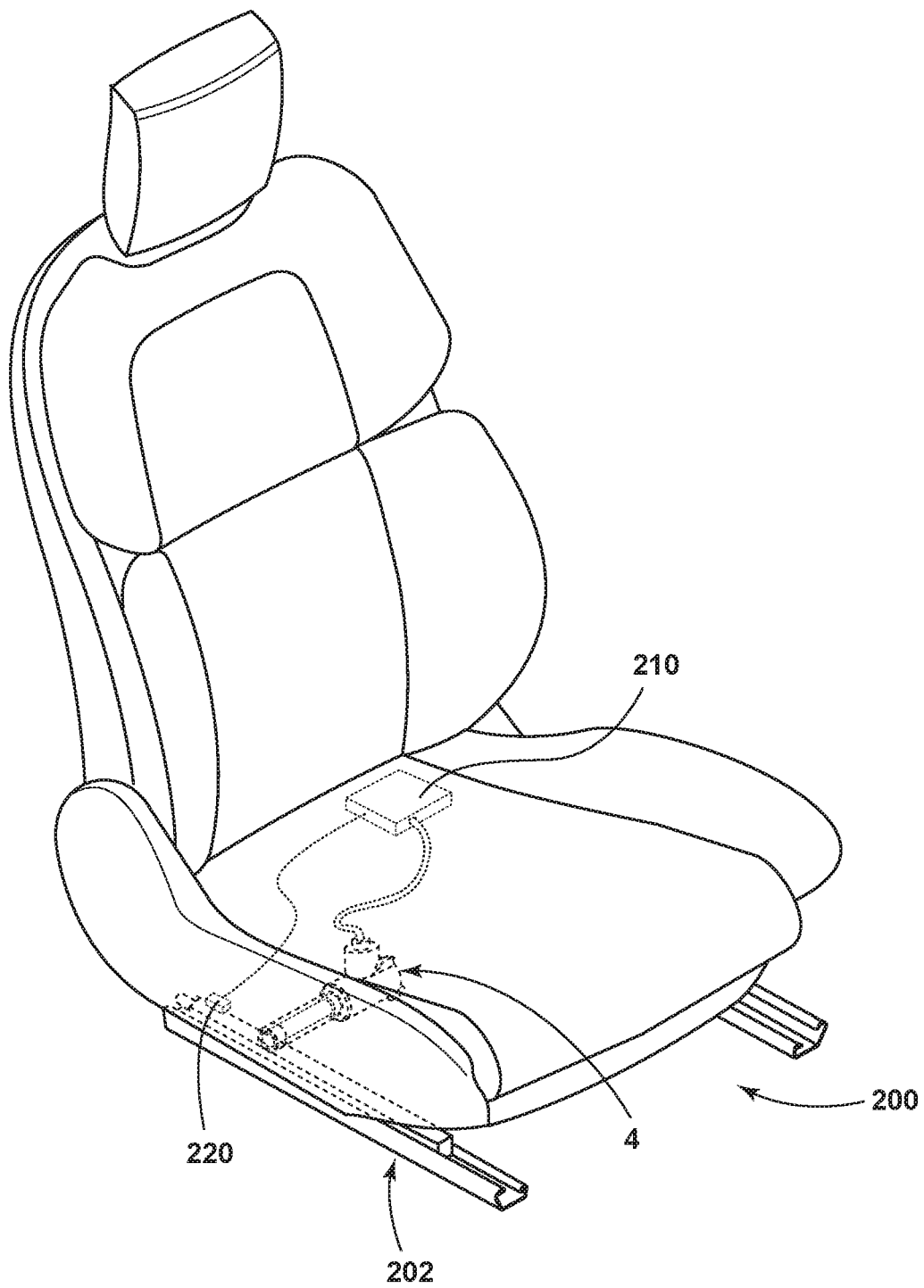
FIG. 4 is a front perspective view of a vehicle seating assembly including the locking device coupled to a slide assembly of the vehicle seating assembly.

With reference to FIGS. 2-4, the locking device 4 may be coupled to the vehicle floor 200 proximate a slide assembly 202 configured to enable translational adjustment of the vehicle seat along the vehicle floor 200 (FIG. 4. The locking device 4 is in communication with an electronic control module 210 configured to send a signal to the ignition device 44. The signal is configured to activate the ignition device 44, causing gas within the gas generating device 40 to instantaneously expand, and the pressure within the cavity 34 to increase. The increased pressure placed upon the flange 56 accelerates the piston 50 away from the first end 36 of the bore 32 and towards the second end 38 of the bore 32, as shown by arrow I (FIG. 2). The gas generating device 40 generates a significant amount of pressure such that the punch 58 is expelled through the cap 60 proximate the first portion 52 of the bore 32. The punch 58 is expelled at a velocity sufficient to pass through the aperture 74 of the fixed plate 70 and puncture the movable plate 80. Once the punch 58 has passed through both the fixed plate 70 and the movable plate 80, the fixed plate 70 and the punch 58 are configured to prevent relative displacement of the movable plate 80. Furthermore, the punch 58 may be configured to additionally pass through the aperture 74 of the second fixed plate 90, providing additional stopping power relative to the movable plate 80.

Referring to FIG. 4, a sensor 220 may be disposed within the seating assembly 2 and configured to detect a condition of the seating assembly 2. The sensor 220 may be a mechanical load sensor configured to detect a force sufficient to displace the seating assembly 2. For example, the load sensor may include, but is not limited to, a force-sensing resistor, a load cell, or a pressure sensor. Alternatively, the sensor 220 may be configured to detect the position of the movable plate 80 when the movable plate 80 has been displaced from a fixed position. Such sensors may include, but are not limited to, infrared sensors, optical sensors, and capacitive sensors. Additionally, the movable plate 80 may include an actuator such as a magnet configured to be detected by a sensor once the movable plate 80 has been displaced from the intended position. In this aspect of the invention, the sensor 220 may include a mechanical reed switch, hall-effect sensor, or equivalents thereof. The sensor 220 may additionally be contained in a restraints control module that is used to trigger an air bag and restraint pretensioners. The sensor 220 may be configured to send a signal to the controller to initiate activation of the locking device 4 once the sensor 220 detects displacement of the movable plate 80. This initiation sequence may happen relatively simultaneous to the detection of displacement of the movable plate 80.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

It is also important to note that the construction and arrangement of the components of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, components shown as integrally formed may be constructed of multiple parts, or elements shown as multiple parts may be integrally formed, the length or width of the structures may be varied, and the nature or number of adjustment positions provided between the components may be varied. It should be noted that the components may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicular locking device, comprising:
   a body including a bore having first and second ends;
   a gas generating device proximate the first end;
   a piston movable along an interior of the bore;
   first and second plates, the first plate having an aperture, wherein the first and second plates comprise part of a seat assembly; and
   wherein activation of the gas generating device accelerates the piston through the aperture and the second plate preventing displacement of the second plate.

2. The vehicular locking device of claim 1, further comprising:
   an electronic control module configured to activate the gas generating device.

3. The vehicular locking device of claim 2, further comprising:
   a sensor configured to detect displacement of the second plate and send a signal to the electronic control module to activate the gas generating device.

4. The vehicular locking device of claim 3, wherein the sensor is a mechanical load sensor.

5. The vehicular locking device of claim 1, wherein the gas generating device comprises a pyrotechnic material configured to expand when activated.

6. The vehicular locking device of claim 1, further comprising a third plate including a second aperture, the piston configured to pass through the second aperture when the locking device is activated.

7. The vehicular locking device of claim 1, wherein the second plate is one of a movable and rotatable plate.

8. The vehicular locking device of claim 1, wherein the first and second plates are substantially parallel.

9. The vehicular locking device of claim 1, wherein the body comprises a plurality of vents configured to enable release of the bore when the gas generating device is activated.

10. The vehicular locking device of claim 1, wherein the piston comprises a narrow punch configured to puncture the second plate.

11. The vehicular locking device of claim 1, wherein an end of the piston includes a flange configured to contact the second end of the bore preventing the piston from exiting the bore after activation of the gas generating device.

12. A vehicular locking device, comprising:
    a body having a bore with a first end proximate a gas generating device and a second end proximate a fixed plate;
    a piston movable along the inside of the bore;
    a seat adjustment assembly having a movable plate disposed proximate to the fixed plate; and
    wherein activation of the gas generating device accelerates the piston through the fixed and movable plates preventing displacement of the seat adjustment assembly.

13. The vehicular locking device of claim 12, further comprising:
    a mounting surface for mounting of said device to a vehicle.

14. The vehicular locking device of claim 13, wherein the mounting surface is mounted to a vehicle seat.

* * * * *